July 17, 1956 — J. ANETSBERGER — 2,754,772
ROLL SIZER AND SLICING MECHANISM
Filed Sept. 7, 1954 — 6 Sheets-Sheet 1

Inventor
Joseph Anetsberger
By
Sheridan, Davis & Cargill
Attorneys

July 17, 1956                J. ANETSBERGER                2,754,772
                      ROLL SIZER AND SLICING MECHANISM
Filed Sept. 7, 1954                                      6 Sheets-Sheet 2
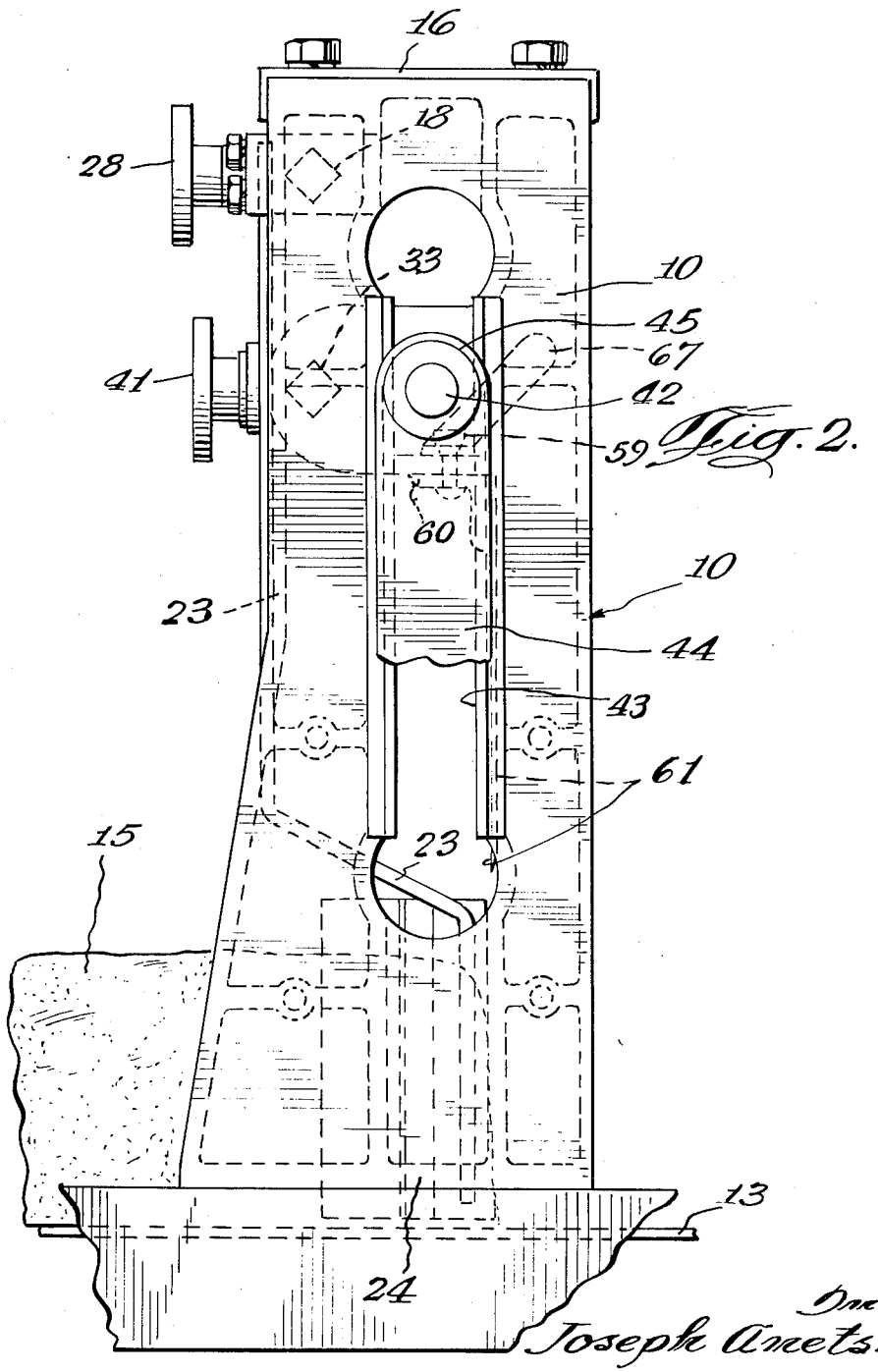
Inventor
Joseph Anetsberger
By
Henderson, Davis & Cargill
Attorneys

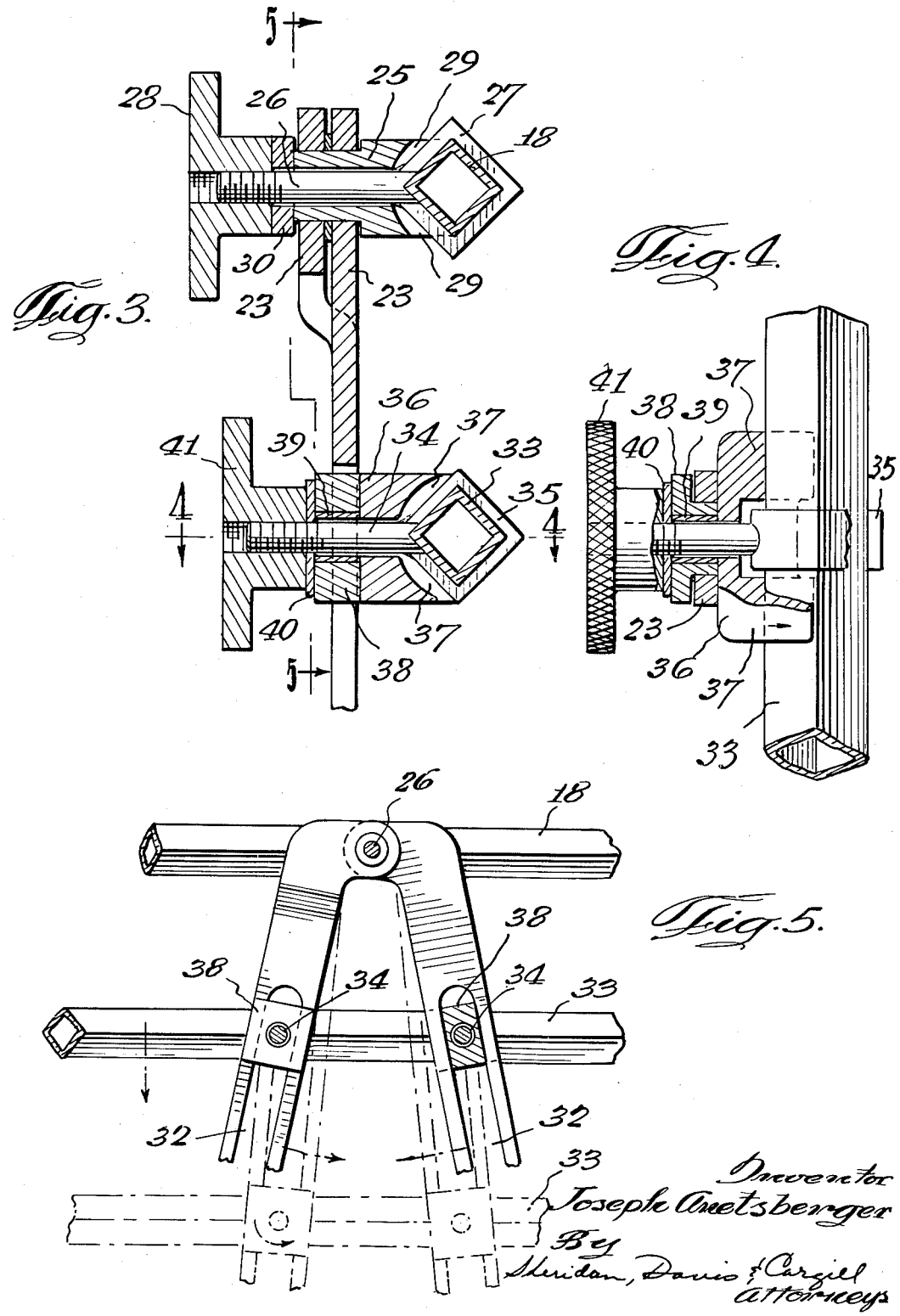

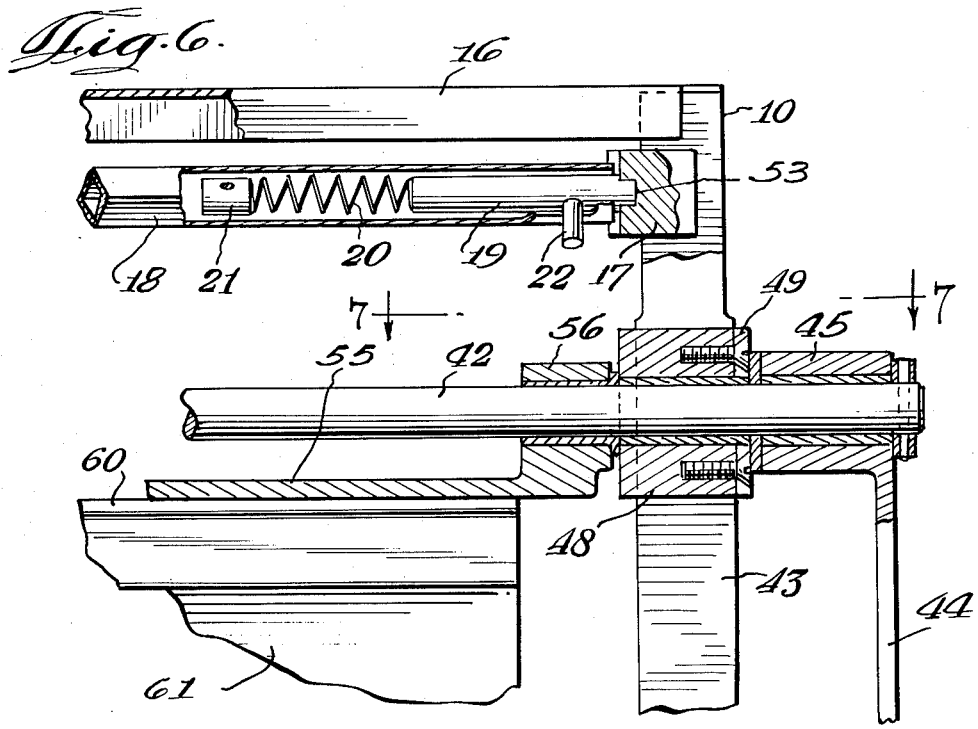
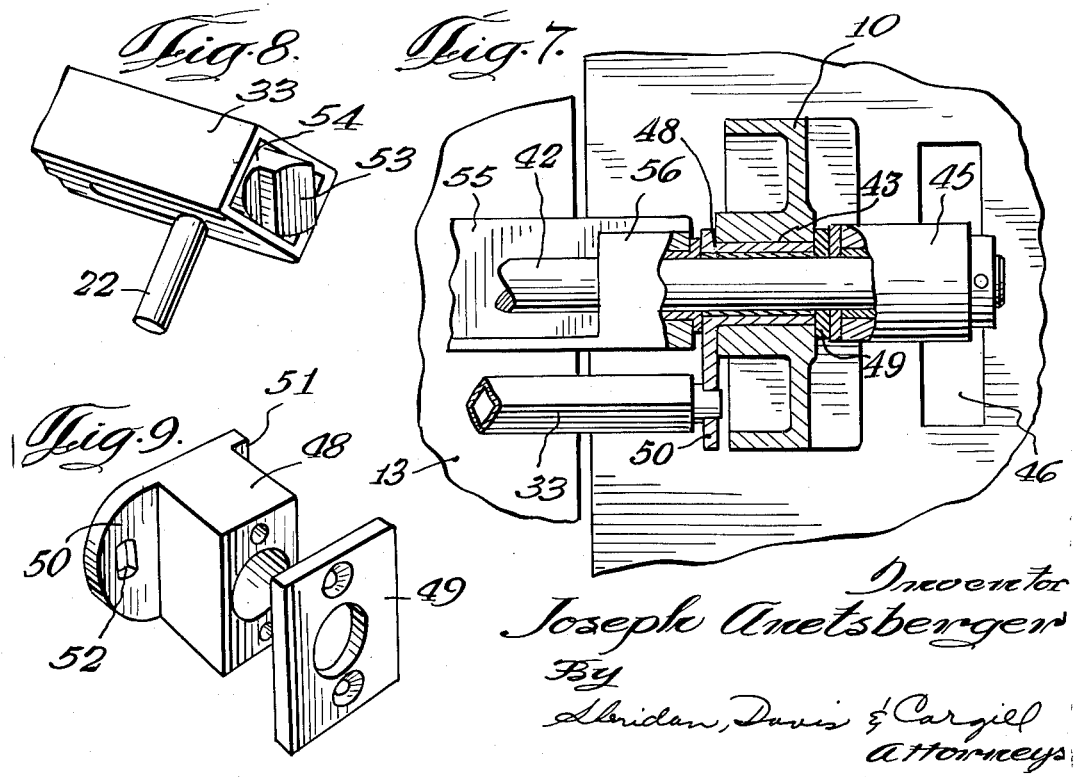

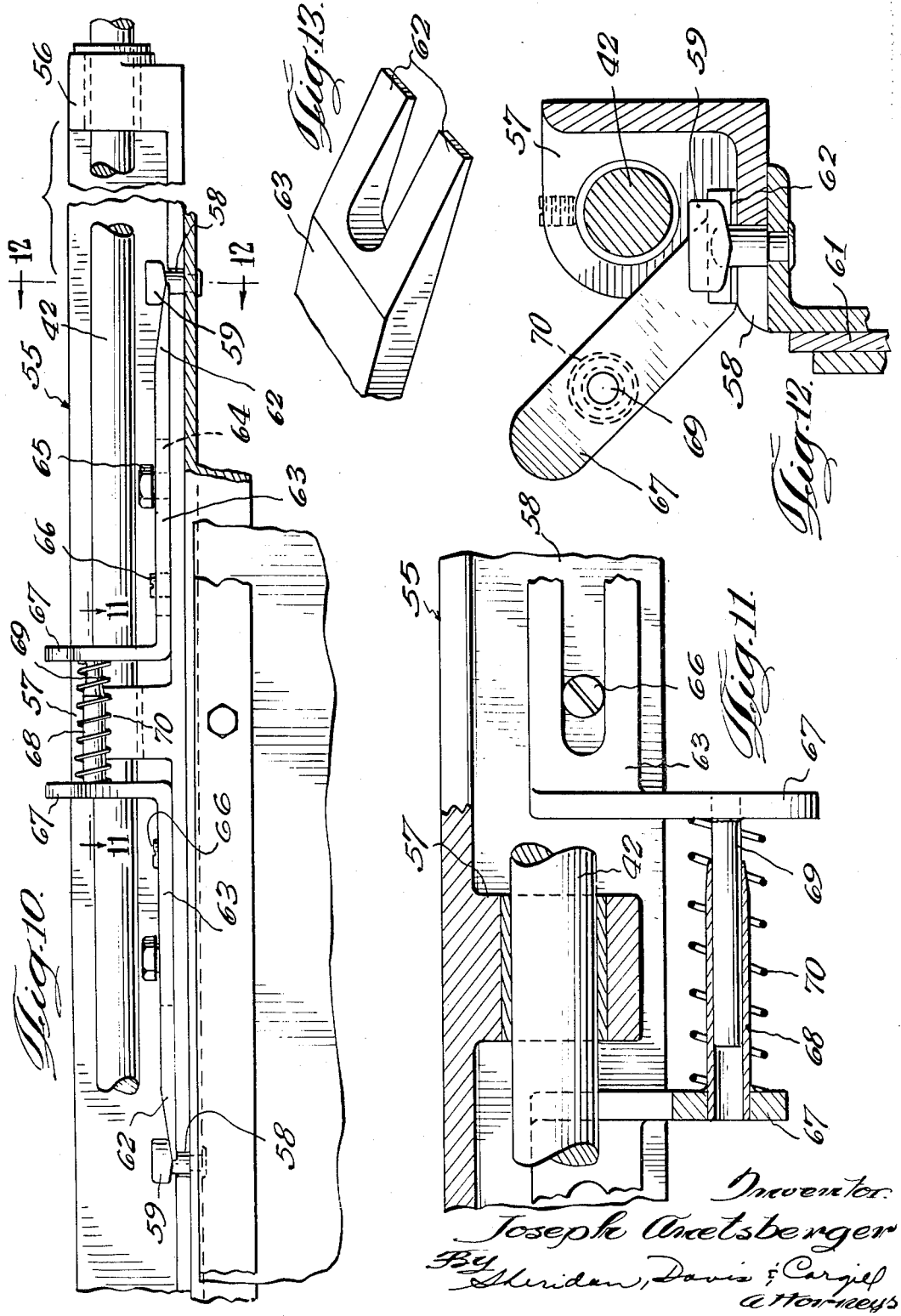

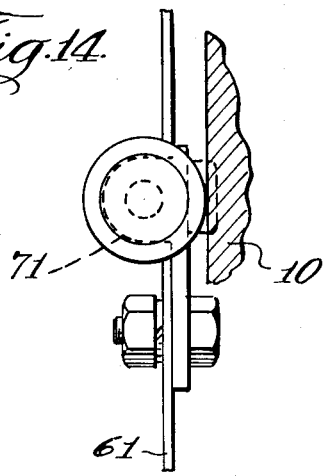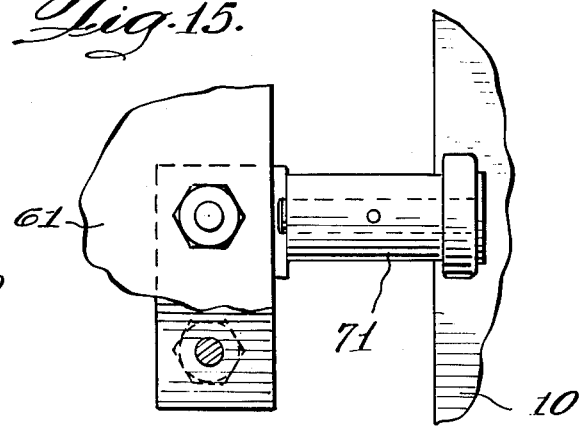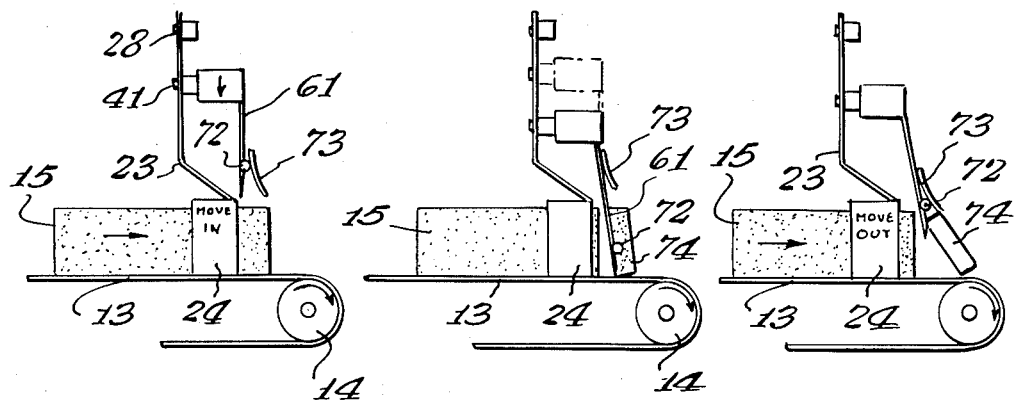

United States Patent Office 2,754,772
Patented July 17, 1956

2,754,772
ROLL SIZER AND SLICING MECHANISM

Joseph Anetsberger, Northbrook, Ill., assignor to Anetsberger Brothers, Inc., Northbrook, Ill., a corporation of Illinois Application September 7, 1954, Serial No. 454,331

5 Claims. (Cl. 107—4)

This invention relates to improvements in roll sizer and slicing mechanism.

In the manufacture of certain types of bakery products, dough in elongate roll form is sliced crosswise of the roll to provide the individual units which, upon baking, provide the commercial product. In the manufacture of sweet rolls or like products for example, an elongate roll of dough may be provided by the helical rolling of dough in sheet form upon which, prior to rolling, is coated with an icing mixture commonly termed "streusel" which consists of sugar, cinnamon, or other flavoring and sweetening substances such as nuts, etc., as may be desired. It will be obvious that such an elongate roll of dough passing beneath a cutting knife which slices crosswise of the roll, may become somewhat flattened and hence the slices will not be uniformly round in shape. It is an object of the present invention to provide an improved mechanism for successively slicing pieces from the end of an elongate roll and concurrently with each slicing operation to re-shape or support the portion of the dough roll adjacent the knife to assure that the cut-off pieces will be of the desired shape.

Another object of the invention is to provide mechanism for repeatedly cutting slices from a moving elongate roll of dough and concurrently with each cutting stroke of the slicing blade to re-size the roll immediately adjacent the plane of the knife to insure that the cut-off piece will be of uniform shape.

Another object of the invention is to provide a mechanism including means for effecting vertical reciprocation of a slicing blade and cooperating horizontal movement of a pair of re-sizing elements which engage the dough roll adjacent the plane of the knife for re-shaping the roll to desired shape at the instant of the slicing operation or to retain the roll against deformation by the action of the knife.

Since the slicing of an elongate roll of dough into bakery size pieces preferably occurs while the roll is moving continuously forward on a belt or the like, the slicing blade of the improved machine is arranged to swing in the direction of movement of the dough roll and to return to an original vertical position following each cutting operation.

Other objects and advantages of the improvements will be apparent from a consideration of the following specification and accompanying drawings wherein:

Fig. 2 is an end elevational view of the mechanism shown in Fig. 1;

Fig. 3 is an enlarged sectional view taken on line 3—3 of Fig. 1;

Fig. 4 is a sectional view taken on line 4—4 of Fig. 3;

Fig. 5 is a sectional view taken on line 5—5 of Fig. 3;

Fig. 6 is a broken sectional view illustrating the right-hand end portions of the upper portion of the mechanism as viewed in Fig. 1 including the horizontally disposed but vertically reciprocal main shaft which operates the vertically reciprocal cutting blade and the horizontally actuated roll sizer elements and associated parts;

Fig. 7 is a broken sectional view taken on line 7—7 of Fig. 6;

Fig. 8 is a fragmentary perspective view of an end portion of a horizontal, vertically reciprocal bar which actuates the roll sizer elements;

Fig. 9 is a perspective view of one of two similar main bearings and end plate therefor for the vertically reciprocal horizontal main shaft;

Fig. 10 is a broken rear view partially illustrating the main shaft and the slicing blade securing means carried by the shaft;

Fig. 11 is an enlarged sectional view taken on line 11—11 of Fig. 10;

Fig. 12 is an enlarged sectional view taken on line 12—12 of Fig. 10;

Fig. 13 is an enlarged perspective view of one end portion of one of two clamp members which secure a knife blade assembly to the reciprocating mechanism shown in Fig. 10;

Fig. 14 is a broken end elevational view of the knife and a roller carried thereby taken on line 14—14 of Fig. 1;

Fig. 15 is a broken elevational view of the parts shown in Fig. 14;

Figs. 16, 17 and 18 are progress views, somewhat diagrammatic, illustrating the swinging positions which the knife may assume during a cycle of operation.

Figure 1:
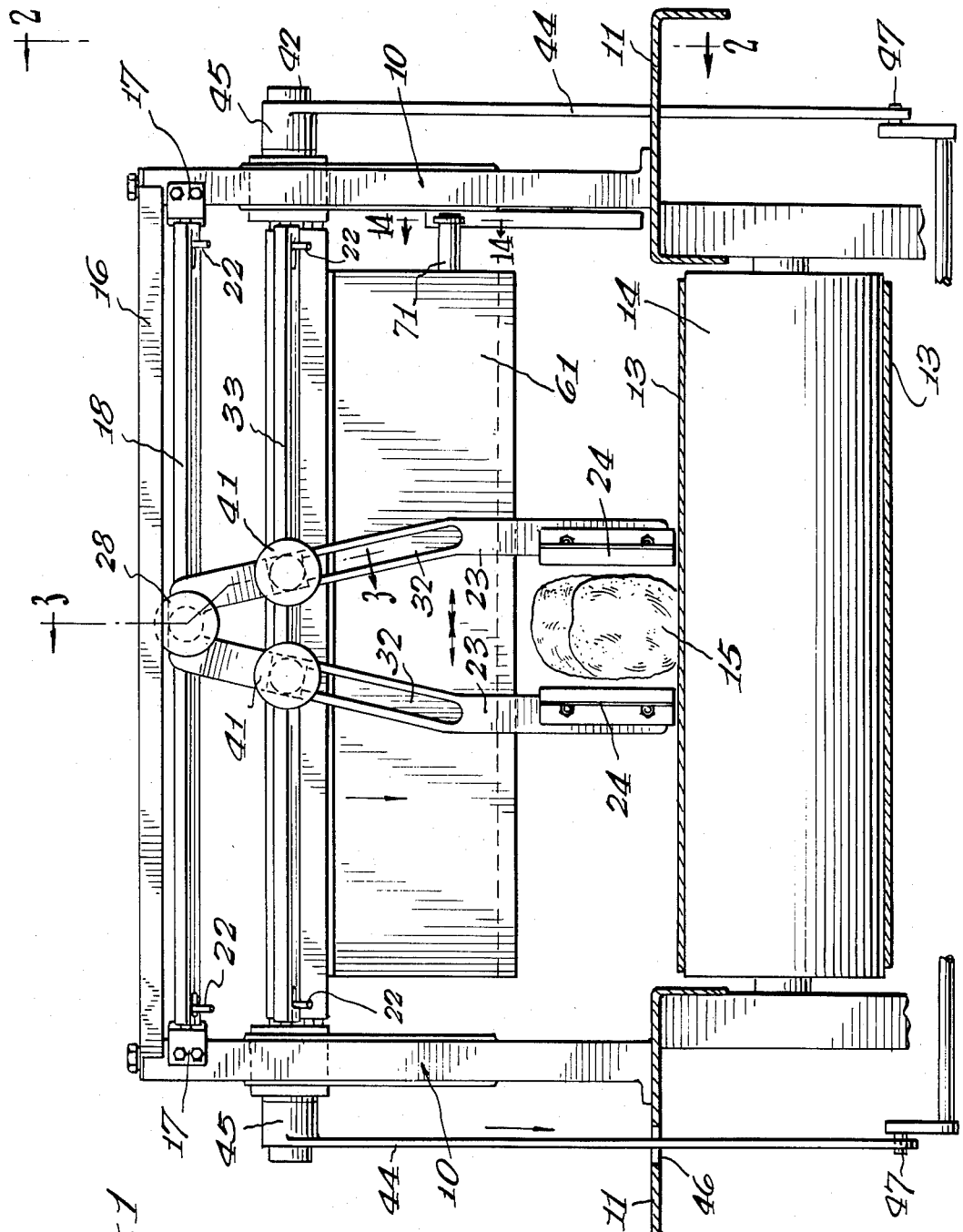
Figure 1 is a rear elevational view of a sizer and slicer mechanism embodying the present improvements shown mounted upon the side frame members of a bakery table comprising a belt conveyor which is shown in transverse section.

In Figs. 1 and 2 of the drawings, the improved machine is shown in operative position spanning a belt conveyor of a bakery table or conveyor mechanism. The machine illustrated comprises two similar vertical members or standards 10 which are mounted by bolts on opposite longitudinal side frames 11 of a dough conveyor or work table comprising an endless belt 13 which passes around suitable end rollers, only one of which is shown, and is indicated by numeral 14. The rollers and belt are motor operated, but the operating mechanism is not shown as it forms no part, per se, of the present invention.

The conveyor or belt 13 of the table carries the dough in elongate roll form to the present invention which slices it crosswise to form bakery size pieces which are to be baked. The slicing of the dough roll, indicated by numeral 15, is accomplished by a knife or blade of the slicer mechanism and during each descent of the knife a pair of sizer members of the roll sizer mechanism are moved into embracing contact with the sides of the dough roll to re-shape it or retain it against deformation by the action of the blade whereby the severed pieces are in the desired form or shape for baking.

Viewing Fig. 1, it will be seen that the upper ends of the end frame or supporting standards 10 are connected by a transversely disposed frame member 16 secured to the standards 10 by bolts or the like to give rigidity to the structure. Secured to each standard 10 near the top and at the rear or left-hand side thereof, as viewed in Fig. 2, is a block-like member 17 for supporting a transversely extending supporting bar 18 for a roll sizer mechanism. The supporting bar 18, in the form shown, is a tube which is rectangular in cross section as shown in Fig. 6. At each end of the tubular support 18 is manually retractable means which enable the bar to be removed from or replaced readily in position. Thus, in Fig. 6, the member 18 is broken away to show an internal plunger 19 at the end which is pressed to the right by a spring 20 backed by a retainer 21 which is secured to the tubular support 18 in any suitable manner and is disposed interiorly thereof. The plunger 19 has a finger piece 22 projecting through a slot in the bottom of support 18. The outer end of the plunger is shaped to provide opposed flat sides which prevent rotation when seated in a rectangular opening in the supporting block 17. Both ends of the bar 18 are similarly provided with retractable members 19 and, as viewed in Fig. 1, the finger pieces 22 can be simultaneously retracted from the supporting cavities in the blocks 17 to remove the bar.

The bar 18 is the support for the roll sizer mechanism which is supported thereon by means which can be shifted laterally of the bar in either direction as may be required in actual use. The roll sizer mechanism comprises, essentially, a pair of arms 23, which are forwardly off-set at the lower portions (see Fig. 2) and each provided with a sizer member 24. The upper portions of the arms 23 converge and one is off-set from the plane common to the adjoining vertical portions of the arms for co-axial mounting upon a bearing member 25 which is mounted on a horizontal stud 26 (see Fig. 3) having a rectangular ring 27 at one end and a threaded portion for a nut 28 at the other end. The ring 27 embraces the rectangular supporting tube 18 while the stud extends through a horizontal bore of member 25 on which the apertured ends of the arms 23 are mounted. The right-hand end of member 25 is centrally cut away or relieved adjacent the ring 27 while the lateral portions 29 of the member bear against the two adjacent flat faces of the tubular bar 18. A washer 30 under the nut 28 bears against the reduced end of the bearing member 25 on which are mounted the ends of the arms 23 and by tightening the nut the tension on the stud draws the rectangular ring 27 to the left (as viewed in Fig. 3) against the bar 18 and presses the member 25 to the right against the bar and thus releasably locks the assembly in position on the bar. The rear, diametrically reduced portion of the member 25 is slightly longer than the thickness of the ends of the two bars and intermediate washer 30, and hence clamping the structure firmly to the bar 18 does not cause binding of the ends of the arms 23 to restrict their swinging movement about the bearing member 25 as an axis.

As shown in Fig. 1, the upper portions of the arms 23 diverge during a portion of their length, which portions are longitudinally slotted as indicated at 32. Below the ends of the slots, as viewed in Fig. 2, the arms are parallel and turn forwardly and thence downwardly into securement with the sizer elements 24 as viewed in Fig. 1. The divergent slotted portions cooperate with means carried by a second horizontal bar 33 to effect opposed concurrent swinging movement of the arms 23 and the sizer elements 24 as the bar 33 is reciprocated vertically by means to be described which operate concurrently with the slicing action of the knife.

The two assemblies by means of which the arms 23 are operatively attached to the reciprocal bar are generally similar to the means for pivoting the arms as above described. One such means is shown in detail in Figs. 3 and 4. As shown, a stud 34 has a rectangular ring 35 at one end to fit about the bar and is threaded at the other end. A spacing member 36 has an axial passage for the stud and at the right hand end is centrally relieved adjacent the ring 35 while the lateral portions 37 are shaped to contact two adjacent flat faces of the bar. A bearing member 38 has a bushed passage 39 to receive the stud and a diametrical rib or extension on one side providing a space of slightly greater depth than the thickness of the arm 23 in the slot 32 of which the rib is located as shown in Fig. 3. A washer 40 is at the left end of bearing 38. A nut 41, when tightened, holds the assembly in laterally adjusted relation on the bar 23 but leaves the member 38 sufficiently free to rock about the stud 34 and to slide vertically relative to the slotted arm as the bar 33 reciprocates.

As will be seen, when the bar 33 is reciprocated vertically by means to be described, downward movement of the bar from the position shown in Fig. 1 will move the arms 23 each toward the other and cause the sizer members 24 carried by the arms to move against a dough roll 15 therebetween to re-size or re-shape the same and to support the end of the dough roll against deformation as the concurrently descending blade severs a slice from the end of the roll. Such engagement of the dough roll by the members 24 is of short duration and may occur as the roll is being fed forwardly by the moving conveyor 13.

By loosening the nuts 28 and 41 the entire sizing apparatus can be shifted to the right or left and by adjusting the arm actuating means relatively upon the bar 33, the re-sizing elements can be adjusted farther apart or closer together to adapt them for operating upon dough rolls of different diameters.

The bar 33, as shown in Fig. 1, is provided with releasing members at its end portions which may be similar to that above described with reference to the structure shown in Fig. 6, whereby the re-sizing structure can be readily detached from the remainder of the apparatus whenever desired.

The bar 33 is detachably connected at its ends in vertically reciprocal structure mounted in the frames 10. A shaft 42 extends horizontally through vertical slots 43 in the frame members 10 (Figs. 2 and 6) and is reciprocated by levers or pitmans 44 having bushed bearing members 45 at the upper ends. The lower ends of the pitmans 44 are shown as extending through slots 46 in the conveyor frame members 11 and are connected to means which actuate them, such as two eccentric pins 47 on power operated mechanism below the lower run of the conveyor 13. The shaft 42, passes through slidable block-like bearings 48 mounted in the slots 43 of the frame members 10, the bearings each having a plate 49 at the outer vertical sides which extend laterally of the sides of the slots, and integral lateral extensions 50 and 51 (Fig. 9) at the inner sides which cooperate with the plate 49 to confine the bearings within the slots as they reciprocate therein.

The extensions 50 of the bearings 48, as shown in Fig. 9, each have an opening 52 therein for receiving the correspondingly shaped end 53 of spring resisted plunger members 54 in the end portions of bar 33, which are of the same construction as the mounting means or plungers 19 of the bar 18 above described with reference to Fig. 6. Fig. 8 illustrates one end of bar 33 in detached relation and the plunger 54 therein. The plungers 54 are provided with finger pieces or pins 22 by means of which the ends 53 of the plungers can be retracted from the openings 52 whenever the roll sizer mechanism is to be detached from the remainder of the apparatus.

The rod or shaft 42 is provided with means for carrying the knife or blade above referred to. The means shown comprises a swingable support in the form of a bar 55 which is L-shape in cross-section and at the ends and central portions is provided with end bearing members 56 and central bearing 57 which have bushed axial aligned openings through which the rod 42 extends. The bearing members 56, 57 are integral with the horizontal and vertical flanges of the bar or may be made so by being welded thereto. The unflanged side of the bar 55 is located on the right-hand or forward side as viewed in Fig. 2 and said side is provided with rearwardly extending slots (two in number) indicated by numeral 58. The slots are spaced apart to correspond with the spacing between head studs 59 carried by an angular backing 60 for a knife or blade 61 secured to the vertical flange of the backing member 60. The lower edge of the blade is sharpened.

The studs 59 are provided with heads as shown in Figs. 10 and 12 beneath which the bifurcated ends 62 of latching members 63 can slide to latch the studs firmly in the position shown in Fig. 12. The latch members 63 extend along and in contact with the top surface of the horizontal flange of the bar 55 and each is provided with a slot 64 therein through which a headed bolt 65 and a guide stud 66 extend into the horizontal flange of bar 55 for securing the respective latch to the bar and guiding it as it slides on the bar. The inner ends 67 of the latches are turned forwardly, as indicated in Fig. 11, and one such end carries a tube 68 and the other a rod 69 slidable telescopically within the tube 68 and cooperating to form a retainer for a spring 70 thereabout which tends to force the ends 62 apart to force the ends 62 of the latching members 63 beneath the heads of the studs 59 to retain the blade 61 in operative position. By manually pressing the outwardly turned ends of the latches together, the ends 62 can be withdrawn from latching position and the blade assembly removed for servicing, as will be obvious.

It will be seen from the foregoing description that the blade can be swung forwardly or to the right, as viewed in Fig. 2, from the normally vertical position, since the blade supporting structure, including the flanged bar or support 55, is swingable on the shaft or rod 42.

As viewed in Figs. 1, 14 and 15, a short shaft 71 is carried by the blade and a roller or wheel 72 is mounted on the shaft. A curved cam 73 is mounted on the right-hand frame or standard 10 shown in Fig. 1. The upper portion of the cam is adapted to be engaged by the wheel 72 when the blade is in the vertical and upper position while the lower portion of the cam is deflected or turned forward or to the right as shown in the diagrammatic representations of Figs. 16–18. Thus, as the blade descends and cuts through the dough roll and engages the belt 13, it will normally tend to move with the belt for an instant before its ascent, and such swinging action is permitted by the pivotal mounting of the bar 55 upon the shaft 42 as above explained. As the mechanism begins to elevate the forwardly displaced blade, the roller 72 will engage the cam 73 and restore the blade 61 to the vertical position. In other words, the roller 72 carried by the blade cooperates with the cam 73 on the up stroke of the blade 61 to insure that the blade is restored to vertical relation as it starts its succeeding down stroke to cut a slice 74 from the roll 15.

In the use of the device it will be seen that upon operation of the pitmans 44 by any suitable means, the speed of which preferably can be controlled by known means not shown, the horizontal shaft 42 will be reciprocated vertically as will the horizontal bar 33. The bar carries the means which, as they descend, cause the arms 23 and the re-sizing elements 24 to move one toward the other to engage opposed sides of the dough roll 15 to re-shape it or support it against further deformation as the blade cuts a slice from the end just forwardly of the members 24. The blade descends as the shaft 42 descends as explained above. On the upstroke of the shaft 42 by the pitmans 44, the sizer elements 24 are moved apart to release the dough roll and the blade which upon contact with the moving belt was deflected forwardly is restored to the vertical position by the coaction of roller 72 with the cam 73.

The thickness of the slices 74 can be varied as desired by varying the rapidity of the strokes of the blade with respect to the lineal velocity of the carrier 13.

While a specific structure illustrative of the improvements has been shown and described, various changes in details thereof may be made without departure from the invention as hereinafter claimed.

I claim:

1. A roll sizer and slicer mechanism comprising standards adapted to be mounted in opposition on the side frames of a dough conveyor, an upper transverse bar carried by the standards and spanning the conveyor, a pair of downwardly diverging arms coaxially pivoted at the upper ends on said bar and provided each with a roll sizer element at the lower end immediately above the conveyor on which the mechanism is mounted, a vertically reciprocal horizontal shaft journalled in vertically sliding bearings in said standards, means engaging the ends of said shaft for effecting vertical reciprocation thereof, a blade carrier on said shaft provided with a pendant blade assembly for severance upon descent thereof of a slice from an elongate dough roll advanced on the conveyor extending between said sizer elements, a lower transverse bar supported at the ends thereof by said sliding bearings for reciprocation with said shaft and said blade, and a pair of arm actuating members carried by said lower bar in spaced apart relation and engaging the divergent arms for actuating the same and the roll sizer elements in unison each toward the other for engaging the dough roll therebetween concurrently with the descent of said blade to sever a slice of dough from the roll.

2. A roll sizer and slicing mechanism comprising standards adapted to be mounted in opposition on the side frames of a dough conveyor, an upper transverse bar carried by the standards and spanning the conveyor, a pair of pendant arms having pivots coaxially supported by said bar and provided with divergent upper portions and each carrying one of a pair of cooperative roll sizer elements at the lower end, a vertically reciprocal horizontal shaft provided with vertically sliding bearing members in said standards, means engaging the ends of said shaft for effecting vertical reciprocation thereof, a blade carrier journalled on said shaft for swinging movement coaxially thereof and provided with means for attaching a pendant blade assembly thereto, a blade assembly carried by said means for reciprocation with the shaft for severance upon descent thereof of a dough roll on the conveyor extending between said sizer elements and swingable forwardly with said carrier about said shaft upon contact of the blade with a moving conveyor, a cam carried by one of said standards, a roller carried by said blade for engagement with the cam upon ascent of the blade from a forwardly swung position for restoration of the blade to vertical position, a second transverse bar carried by said bearing members for vertical reciprocation therewith, and arm actuating members carried by said second bar and each slidably engaging the divergent portion of one of said arms for swinging the arms pivotally for moving said sizer elements each toward the other upon descent of said second bar for causing the sizer elements to engage the dough roll therebetween during the cutting stroke of said blade and to move apart to release the dough roll upon ascent of said second bar.

3. In a roll sizing and slicing machine comprising a pair of vertically slotted standards adapted to be mounted oppositely on the opposed side frame members of a dough conveyor, a vertically reciprocal horizontal shaft provided with bearings each slidable within a slot in one of said standards, means engaging the ends of said shaft for reciprocating the same, a blade attached to said shaft for cutting slices transversely from an elongate roll of dough on the conveyor, a reciprocal bar or transverse rod carried by said bearings for reciprocation therewith, a second transverse rod carried by said standards at an elevation above said first mentioned rod, a pair of arms pivotally mounted at the upper ends on said second mentioned rod and having downwardly divergent sections provided with longitudinal slots therein, a pair of laterally adjustable pivotal members on said reciprocal bar and having portions seated in the slots of said arms for swinging the arms pivotally in opposite directions as the bar reciprocates, and dough sizing elements on the lower ends of said arms movable each toward the other to engage a dough roll therebetween as the blade descends and movable in the opposite directions as the blade ascends.

4. Mechanism as specified in claim 3 wherein both said rods are provided at the ends with spring resisted, manually retractable supporting means whereby said rods and arms and the dough sizer elements can be removed as a unit from the machine.

5. A roll sizer and slicer mechanism comprising standards adapted to be mounted on opposite sides of a dough conveyor, a transverse member carried by said standards and spanning the conveyor, a pair of downwardly extending arms pivoted at their upper ends on said member and provided each with a roll sizer element at the lower end immediately above said conveyor, a blade supported by said standards for vertical reciprocation adjacent said sizer elements, actuating means for vertically reciprocating said blade to sever, upon descent thereof, a slice from a dough roll advanced on said conveyor between said sizer elements, and means operable by said actuating means for moving said sizer elements in unison toward each other for engaging the dough roll therebetween concurrently with the descent of said blade and for moving said sizer elements away from each other as said blade is raised.

References Cited in the file of this patent

UNITED STATES PATENTS 2,660,133     Anetsberger et al. _____ Nov. 24, 1953